Patented Sept. 7, 1943

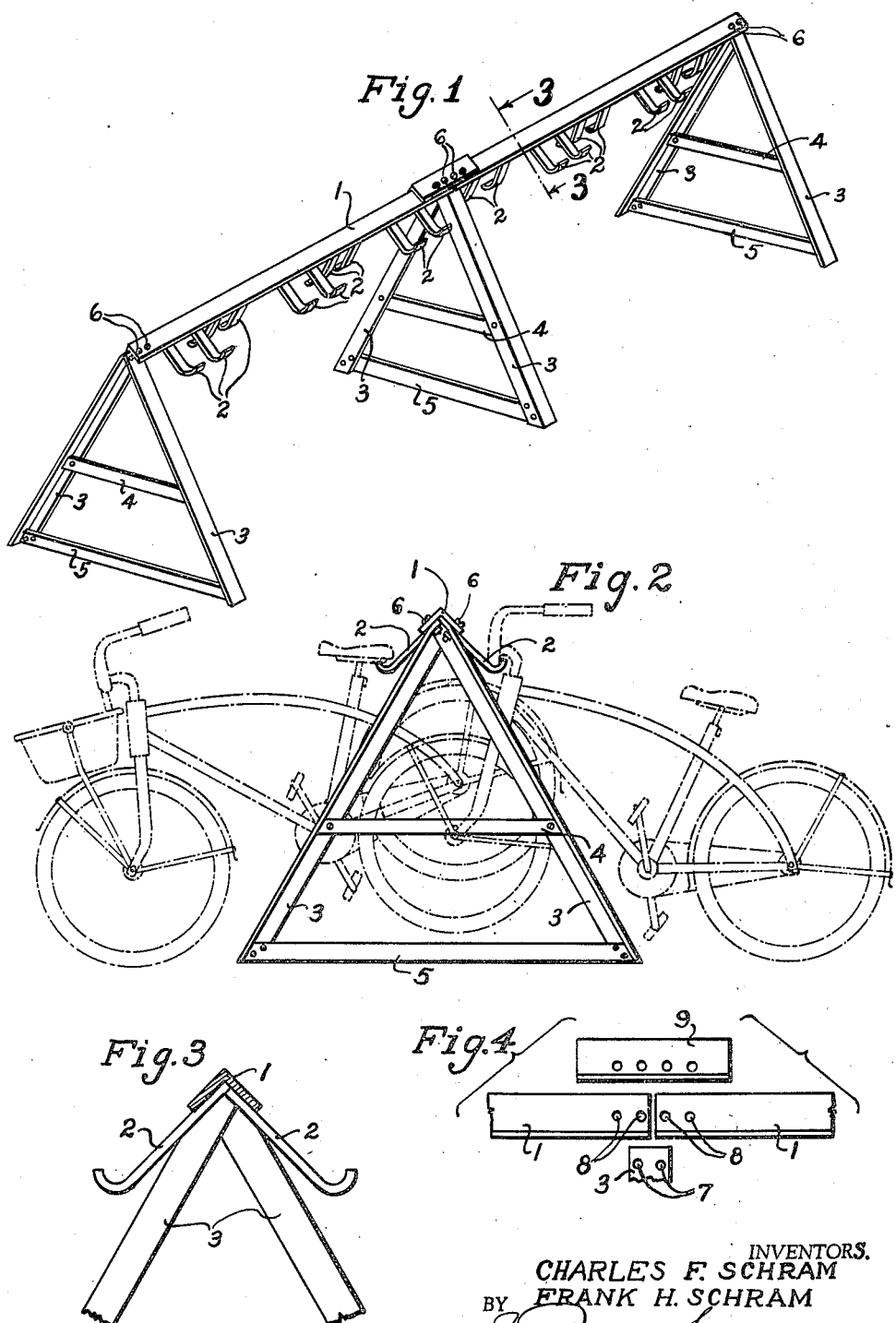

2,329,088

UNITED STATES PATENT OFFICE 2,329,088

BICYCLE RACK

Charles F. Schram and Frank H. Schram, Wichita Falls, Tex.

Application April 13, 1942, Serial No. 438,836

7 Claims. (Cl. 211—17)

This invention relates to an improvement in bicycle racks, particularly for holding a plurality of bicycles in standing positions.

It is often desired to provide a rack for holding a plurality of bicycles in upright, side by side relation, and racks have been suggested heretofore for this purpose, but which required the standing of the bicycles in side by side relation. These were objectionable because of the entangling of the bicycles in such positions, often resulting in injury or breakage thereof, especially when the pedal of one bicycle catches in the spokes of the next adjacent bicycle. Furthermore, such racks as received a wheel and mud guard of a bicycle have been objectionable, not only because of the resulting ineffective support thereof, but also because of scratching and other injury resulting to the bicycle by reason of the close fitting of the wheel in the rack.

The object of this invention is to improve the construction of bicycle racks, to provide for the side by side supporting of bicycles by means of the handle bars or seat thereof, and in relations such that there is no danger of injury to the adjacent bicycle. This arrangement also facilitates the ready attachment or detachment of the bicycle to the support.

A further object of the invention is to improve the construction of the frame to provide for a secure, rigid frame structure that will support a series of bicycles in upstanding relation, and which has provision, when desired, for disassembly to enable the frame to be knocked-down for shipment, and then set up at the place of use.

In carrying out these objects, we have provided an elongated supporting bar or beam, of wood, metal, or other material, with a series of pairs of laterally projecting hooks attached thereto on opposite sides thereof, so arranged as to engage and support bicycles by attachment of the handle bars or seat thereto, and with alternate pairs of hooks on opposite sides arranged in staggered relation such that there is no danger of entanglement of the bicycles with each other which might cause injury thereto, and especially would prevent the pedal of one bicycle from catching in the spokes of an adjacent bicycle. At the same time, this arrangement permits the bicycles to be engaged with or disengaged from the respective hooks readily and simply, when desired, and yet forms a secure rigid supporting stand for the desired number of bicycles.

We have shown a preferred embodiment of our invention in the accompanying drawing, in which:

Fig. 1 is a perspective view of the preferred form of our bicycle stand;

Fig. 2 is an end elevation thereof, showing the manner of attaching bicycles thereto;

Fig. 3 is a cross section through the stand on the line 3—3 of Fig. 1, and;

Fig. 4 is a disassembled side elevation of a portion of the stand at the joint between the sections thereof.

As shown in the drawing, our stand preferably comprises a beam designated generally by the numeral 1, which is shown as of angle bar form, although it is obvious that it may be constructed of other shapes and materials, such as a round pipe or a wooden beam.

On opposite sides of the beam 1 is a series of pairs of hooks 2. The pairs being spaced apart lengthwise of the beam and arranged to project in opposite directions therefrom, as shown particularly in Figs. 2 and 3. The hooks of each pair are spaced apart a distance sufficient to receive the frame and a wheel, including the mud guard of the latter, therebetween, and yet to be disposed sufficiently close so as to engage the handle bars on opposite sides of the frame, as shown at the right in Fig. 2, or spaced portions of the seat, as shown at the left in Fig. 2. Each of the hooks is formed preferably with an elongated shank that is rigidly attached at one end to the under side of the beam in the form shown, as by welding or otherwise, while the opposite end thereof is turned upward to engage under the handle bars, or with the frame or springs of the seat, and thus provide a secure support for a bicycle at either the front or back thereof. At the same time, this relation permits a bicycle to be readily attached to, or detached from the hooks at either end.

The pairs of hooks 2 that project in opposite directions are staggered, as shown in Fig. 1, so that the bicycles engaged therewith are thus supported in upstanding side by side relation, but without overlapping sufficiently that injury results to the adjacent bicycles. The hooks project laterally from the beam 1 sufficiently so that the pedal of one bicycle cannot engage in the spokes of the adjacent bicycle and result in injury thereto. Furthermore, the relation is such that the bicycle is not supported by its mud guard which would cause injury thereto, but is entirely and effectively supported by the frame, either through the handle bars or the seat.

The beam 1 is supported on spaced legs or frames so as to provide a rigid and secure support therefor. As shown in the drawing, each of these supporting frames has a pair of diverging sides 3, also formed of angle bars. The diverging sides 3 are braced at 4 and 5, with said braces either rigidly or detachably connected therewith by bolts, rivets, welding, or other fastenings. The lowermost brace 5 is shown as disposed at the lower ends.

On opposite sides of the beam 1 is a series of pairs of hooks 2. The pairs are spaced apart lengthwise of the beam and arranged to project in opposite directions therefrom, as shown particularly in Figs. 2 and 3. The hooks of each pair are spaced apart a distance sufficient to receive the frame and a wheel, including the mud guard of the latter, therebetween, and yet to be disposed sufficiently close so as to engage the handle bars on opposite sides of the frame, as shown at the right in Fig. 2, or spaced portions of the seat, as shown at the left in Fig. 2. Each of the hooks is formed preferably with an elongated shank that is rigidly attached at one end to the under side of the beam in the form shown, as by welding or otherwise, while the opposite end thereof is turned upward to engage under the handle bars or with the frame or springs of the seat, and thus provide a secure support for a bicycle at either the front or back thereof. At the same time, this relation permits a bicycle to be readily attached to or detached from the hooks at either end.

The pairs of hooks 2 that project in opposite directions are staggered, as shown in Fig. 1, so that the bicycles engaged therewith are thus supported in upstanding side by side relation, but without overlapping sufficiently that injury results to the adjacent bicycles. The hooks project laterally from the beam 1 sufficiently so that the pedal of one bicycle cannot engage in the spokes of the adjacent bicycle and result in injury thereto. Furthermore, the relation is such that the bicycle is not supported by its mud guard which would cause injury thereto, but is entirely and effectively supported by the frame, either through the handle bars or the seat.

The beam 1 is supported on spaced legs or frames so as to provide a rigid and secure support therefor. As shown in the drawing, each of these supporting frames has a pair of diverging sides 3, also formed of angle bars. The diverging sides 3 are braced at 4 and 5, with said braces either rigidly or detachably connected therewith by bolts, rivets, welding, or other fastenings. The lowermost brace 5 is shown as disposed at the lower ends of the sides 3 so as to prevent the latter from penetrating the ground when the stand is mounted on a non-rigid surface. This arrangement also prevents danger of the overturning of the frame either due to high wind or when one or more bicycles are being attached thereto or detached therefrom.

Provision is made for detachably connecting the beam 1 with the supporting frames thereof, either for knock-down construction during shipping or for extension when it is desired to add sections thereto. For this purpose the sides 3 are preferably connected with opposite ends of the beam 1 through bolts 6. The upper end of each leg 3 has a pair of holes 7 therethrough, as shown in Fig. 4, and a pair of holes 8 are formed in each end of the beam 1, to receive the bolts 6 therethrough. Thus, each end of the beam 1 may be detachably secured to the supporting frame through either two bolts or four bolts, as desired or found necessary. At the same time when it is found desirable to extend the rack by adding additional sections thereto, this may be accomplished readily by the alignment of the beams 1, as shown in Fig. 4. In this event, a connecting plate 9 is provided, preferably overlapping the adjacent ends thereof and secured by the bolts 6 thereto, as shown also at the middle in Fig. 1. This forms a rigid structure which may, nevertheless, be detached when desired, or set up after being shipped in collapsed condition.

The use of this stand will be readily understood from the foregoing description in connection with the Figs. 1 and 2. The desired number of bicycles may be supported thereby in upstanding side by side relation, in sufficiently close positions for compactness, while yet insuring lack of danger of injury to the bicycles supported thereby. This not only prevents entanglement of the bicycles, but it also insures freedom from scratching or marring either the frames or the mud guards thereof. The bicycles may be readily attached to or detached from the stand when desired.

We claim:

1. A bicycle rack comprising an elongated beam of angle bar construction having oppositely diverging sides, a plurality of pairs of hooks arranged respectively on opposite sides of the beam and extending in downwardly diverging relation, the hooks of each pair being formed of elongated arms laterally spaced from each other with the inner ends thereof rigidly fixed to one of the diverging sides of the beam and with the opposite ends thereof up-turned to form a supporting hook, and means for supporting said beam.

2. A bicycle rack comprising an elongated beam of angle bar construction having oppositely diverging sides, means carried by said beam for supporting a bicycle, and a plurality of supporting frames for supporting said beam at points spaced apart lengthwise thereof, each of said supporting frames having laterally diverging sides with an apex portion at the top of said frame underlying a portion of said beam between the diverging sides of the angle bar thereof, and means for securing said beam directly to the supporting frames with said frames depending from the beam.

3. A bicycle rack comprising an elongated beam of angle bar construction having oppositely diverging sides, means carried by said beam for supporting a bicycle, and a plurality of supporting frames for supporting said beam at points spaced apart lengthwise thereof, each of said supporting frames having laterally diverging sides with an apex portion at the top of said frame underlying a portion of said beam between the diverging sides of the angle bar thereof, means for bracing the diverging sides of each supporting frame, and means for securing the diverging sides of the angle bar directly to the diverging sides of each supporting frame with said frames depending from the beam.

4. A bicycle rack comprising an elongated beam of angle bar construction having oppositely diverging sides, means carried by said beam for supporting a bicycle, and a plurality of supporting frames for supporting said beam at points spaced apart lengthwise thereof, each of said supporting frames having laterally diverging sides with an apex portion at the top of said frame underlying a portion of said beam between the diverging sides of the angle bar thereof, and fastening bolts extending through the adjacent diverging sides of the angle bar and supporting frames detachably fastening the same together.

5. In a bicycle rack, an elongated beam adapted to be supported in elevated position, said beam having pairs of support members extending laterally therefrom and having the inner ends thereof fixed to said beam, one pair of said members extending in one direction and another pair extending in the opposite direction, both of the support members of one pair being spaced lengthwise of said beam in the same longitudinal direction from both of the support members of the other pair, the support members of each pair being spaced apart to receive the bicycle therebetween in upstanding relation, said members being arranged in positions to engage respectively laterally projecting portions of the bicycle on opposite sides of the frame thereof, whereby bicycles may extend in opposite directions from said beam.

6. A bicycle rack comprising an elongated beam, means for supporting said beam in elevated position, said beam having pairs of support members extending laterally therefrom at downwardly diverging angles and having the inner ends thereof fixed to said beam, one pair of said members extending in one direction and another pair extending in the opposite direction, both of the support members of one pair being spaced lengthwise of said beam in the same longitudinal direction from both of the support members of the other pair, said support members of each pair being spaced apart a distance greater than the width of the frame of the bicycle and less than the width of the handle bars thereof to engage the handle bars and hold the bicycle in upstanding relation therebetween, whereby bicycles may extend in opposite directions from said beam.

7. A bicycle rack comprising an elongated beam, means for supporting said beam in elevated position, said beam having pairs of support members extending laterally therefrom at downwardly diverging angles and having the inner ends thereof fixed to said beam, one pair of said members extending in one direction and another pair extending in the opposite direction, both of the support members of one pair being spaced lengthwise of said beam in the same longitudinal direction from both of the support members of the other pair, said support members of each pair being spaced apart a distance greater than the width of the frame of the bicycle and less than the width of the seat and having hook portions thereon to engage the seat and hold the bicycle in upstanding relation therebetween, whereby bicycles may extend in opposite directions from said beam.

CHARLES F. SCHRAM.
FRANK H. SCHRAM.